(12) United States Patent
Derks

(10) Patent No.: US 7,747,261 B2
(45) Date of Patent: Jun. 29, 2010

(54) ASYNCHRONOUS RESPONSE SYSTEM WITH ACKNOWLEDGE

(75) Inventor: Harry G. Derks, Holland, MI (US)

(73) Assignee: Fleetwood Group, Inc., Holland, MI (US)

(*) Notice: Subject to any disclaimer, the term of this patent is extended or adjusted under 35 U.S.C. 154(b) by 944 days.

(21) Appl. No.: 11/465,268

(22) Filed: Aug. 17, 2006

(65) Prior Publication Data

US 2007/0042724 A1 Feb. 22, 2007

Related U.S. Application Data

(60) Provisional application No. 60/595,932, filed on Aug. 18, 2005.

(51) Int. Cl.
*H04W 68/00* (2009.01)

(52) U.S. Cl. ............... 455/458; 370/445; 370/447; 455/2.01; 455/463

(58) Field of Classification Search ........... 370/431, 370/445, 447; 455/2.01
See application file for complete search history.

(56) References Cited

U.S. PATENT DOCUMENTS

| | | | |
|---|---|---|---|
| 3,200,516 A | 8/1965 | Parker | |
| 4,048,729 A | 9/1977 | Derks | |
| 4,315,466 A | 2/1982 | Boerigter | |
| 4,375,707 A | 3/1983 | Boerigter | |
| 4,392,132 A | 7/1983 | Derks | |
| 4,410,985 A * | 10/1983 | Yasumoto et al. | 714/717 |
| 5,093,786 A | 3/1992 | Derks | |
| 5,379,213 A | 1/1995 | Derks | |
| RE35,449 E * | 2/1997 | Derks | 709/227 |
| 5,724,357 A | 3/1998 | Derks | |
| 6,021,119 A | 2/2000 | Derks | |
| 6,665,000 B1 | 12/2003 | Buehler | |
| 7,008,027 B2 | 3/2006 | Kelley | |
| 7,330,716 B2 | 2/2008 | Adkins | |
| 2003/0153263 A1* | 8/2003 | Glass et al. | 455/2.01 |
| 2003/0153321 A1 | 8/2003 | Glass | |

(Continued)

OTHER PUBLICATIONS

Commonly assigned U.S. Appl. No. 11/424,717 filed on Jun. 16, 2006, entitled Wireless Response System with Feature Module (P-318B1).

(Continued)

*Primary Examiner*—William Trost, IV
*Assistant Examiner*—Siming Liu
(74) *Attorney, Agent, or Firm*—Van Dyke, Gardner, Linn & Burkhart, LLP

(57) ABSTRACT

A wireless response system and method of receiving user responses from a plurality of users at a base unit includes providing a base unit having a base transceiver that is adapted to wireless signal transmitting and wireless signal receiving and providing a plurality of response units. Each of the response units includes a response unit transceiver and a user input device. The response unit transceiver is adapted to wireless signal transmitting and wireless signal receiving. User input selections are received with the user input device. A response user transmission is transmitted with the response unit transceiver in response to the user input device receiving a user input selection. A base transmission is transmitted with the base unit transceiver. The user response transmissions are asynchronously transmitted after receipt of a base transmission.

18 Claims, 3 Drawing Sheets

U.S. PATENT DOCUMENTS

| | | |
|---|---|---|
| 2003/0153347 A1 | 8/2003 | Glass |
| 2003/0236891 A1* | 12/2003 | Glass et al. ................ 709/227 |
| 2004/0229642 A1 | 11/2004 | Derks |
| 2006/0072497 A1 | 4/2006 | Buehler |
| 2006/0166685 A1* | 7/2006 | Adkins ...................... 455/458 |
| 2007/0280143 A1 | 12/2007 | Crosby et al. |

OTHER PUBLICATIONS

Description of prior art system entitled "Turning Technologies/Responsive Innovations Protocol Analysis Sep. 12, 2005.".

* cited by examiner

ASYNCHRONOUS RESPONSE SYSTEM WITH ACKNOWLEDGE

CROSS REFERENCE TO RELATED APPLICATION

This application claims priority from U.S. provisional patent application Ser. No. 60/595,932, filed on Aug. 18, 2005, the disclosure of which is hereby incorporated herein by reference in its entirety.

BACKGROUND OF THE INVENTION

The present invention is directed to response systems in which user responses entered in respective response units, also known as keypads, are retrieved at a base unit and, in particular, to such a response system in which the base unit acknowledges receipt of valid data from the response units.

One known form of response system utilizes time division multiplexing for organizing retrieval of user responses entered into response units, which are typically handheld units provided to a gathering of users. In such a system, a transmission by the base unit initiates a series of timeslots, each assigned to a particular response unit. Each unit having a selection entered by the user responds to the base unit transmission in its assigned timeslot. While pure time division multiplex systems accommodate the sending of data from the base unit to the response unit, such as data acknowledging receipt of valid data from particular response unit(s), it is not without limitation. For example, as the number of response units increase, the increase in assigned timeslots can excessively increase the duration between transmissions from the base unit.

Asynchronous response systems are also known. Timing of transmission from response units in an asynchronous response system is event driven, rather than controlled by the base unit. In particular, entry of a response by a user typically results in an immediate transmission of data from that response unit. Because more than one user may make an entry at the same moment, resulting in potential interference between transmissions, schemes have been devised for handling such data collisions. However, the asynchronous nature of the transmissions from the response units has made the acknowledging of validly received data by the base unit not practical.

SUMMARY OF THE INVENTION

The present invention is directed to a response system having at least one base unit and a plurality of response units that accommodates acknowledgement by the base unit of valid data received from response units in an asynchronous system.

A wireless response system and method of receiving user responses from a plurality of users at a base unit according to an aspect of the invention includes providing a base unit having a base transceiver that is adapted to wireless signal transmitting and wireless signal receiving and providing a plurality of response units. Each of the response units includes a response unit transceiver and a user input device. The response unit transceiver is adapted to wireless signal transmitting and wireless signal receiving. User input selections are received with the user input device. A response user transmission is transmitted with the response unit transceiver in response to the user input device receiving a user input selection. A base acknowledgement transmission is transmitted with the base unit transceiver in response to receipt of a valid response unit transmission that was transmitted by a response unit. The user response transmissions are asynchronously transmitted.

These and other objects, advantages and features of this invention will become apparent upon review of the following specification in conjunction with the drawings.

DESCRIPTION OF THE PREFERRED EMBODIMENT

Figure 1:
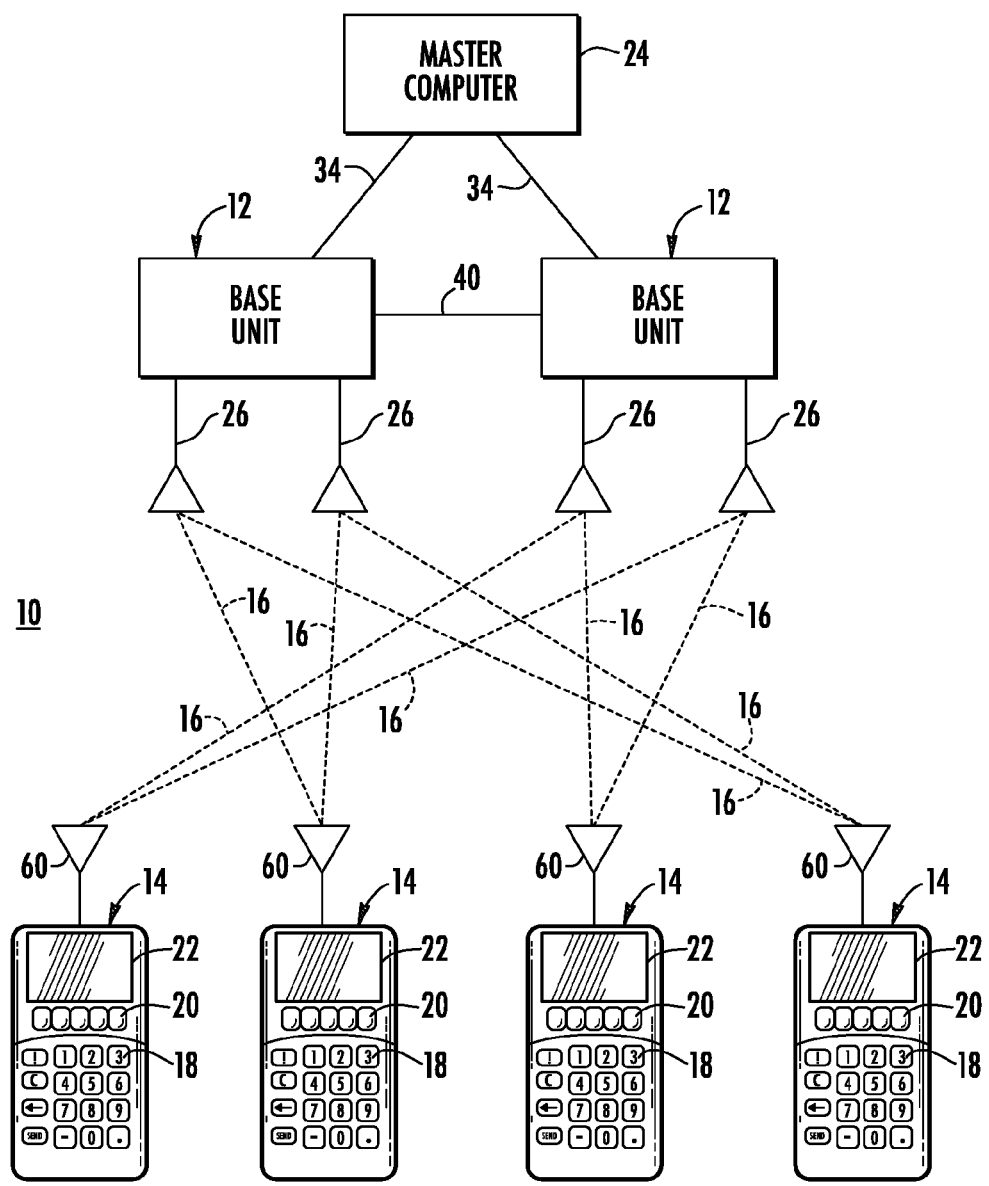
FIG. 1 is a block diagram illustrating a wireless response system useful with the invention.

Referring now specifically to the drawings, and the illustrative embodiments depicted therein, a wireless response system 10 includes one or more base units 12 and a plurality of response units, or keypads, or handheld units, 14 which communicate with the base unit(s) over one or more wireless communication links 16. The base units send signals, also known as base packets or base transmission, to the response units over wireless communication links 16 between one or more antenna 26 on the base unit(s) and one or more antenna 60 on the respective response unit. The response units send response data, also known as response packets or keypad transmission, to the base unit over the wireless communication link(s). The response data is entered in the respective response unit 14 by a user. An illustration of further details of base unit 12 and response units 14 is generally as disclosed in commonly assigned United States Published Patent Application Nos. 2003/0153347 A1; 2003/0153321 A1; 2003/0153263 A1; 2004/0229642 A1; and 2006/0072497 A1 and issued U.S. Pat. Nos. 35,499; 5,724,357; and 6,021,119, the disclosures of which are hereby collectively incorporated herein by reference.

Each response unit 14 may include user input devices, such as a hardware keypad 18, a series of soft keys 20, or the like. Other input devices may be utilized, such as handwriting recognition pads, joysticks, or the like. Each response unit 14 may additionally include a display 22 for displaying information to the user as well as indicating user selections. Base unit 12 may be connected with a command computer 24 in order to provide top level control of wireless response system 10, as well as to run software applications to analyze data produced by wireless response system 10. Such application software is known in the art and has been developed for various commercially available response systems including Applicant's REPLY® response system. They may include programs which produce data synchronized with an event to illustrate user responses, and which may be broken down by categories of users during each interval of the event. Other examples include various data-charting applications, statistical analysis applications, and the like.

Figure 2:
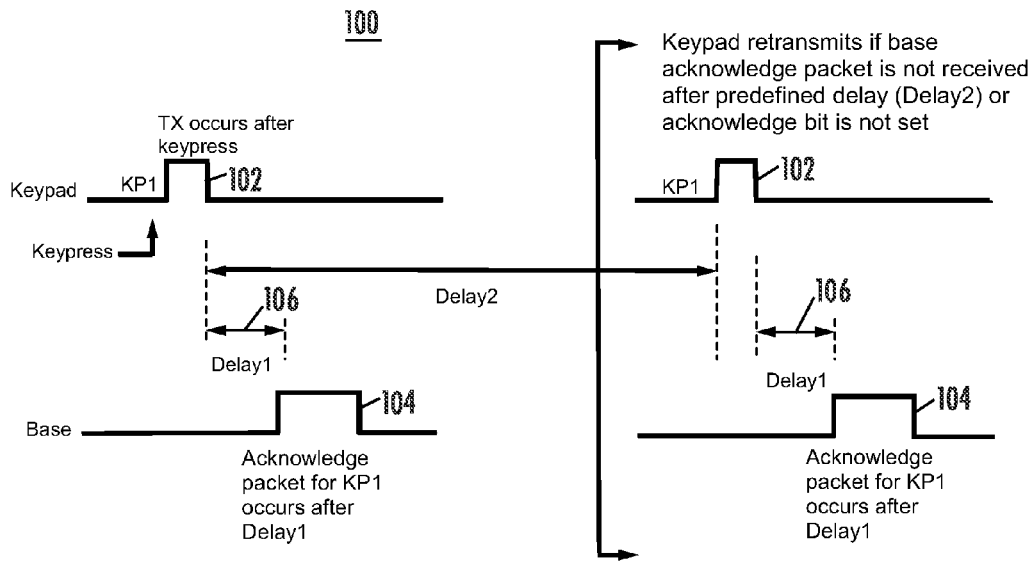
FIG. 2 is a signal timing diagram for transmissions between a base unit and a representative response unit, also known as a keypad, according to an aspect of the invention.

Referring now to FIG. 2, an event driven keypad transmit with event driven acknowledge asynchronous protocol 100 for a response system includes the base continuously listening for keypad transmissions. The base unit 12 will not transmit unless it receives a legitimate keypad transmission 102 from a response unit 14. Keypad transmissions may consist of a header, channel identification (id), keypad address, message, and error-checking code. If the base unit receives a keypad transmission, it responds to the keypad by transmitting an acknowledge packet 104 which may consist of a header, channel id, optional keypad address, receive acknowledgement or correct/incorrect bits, and error-checking codes. This acknowledgement packet can either be sent immediately upon receipt of the keypad transmission, whereby referencing the address is not necessary. Alternatively, the acknowledgement packet may be sent after a delay 106, in which case, the address of the keypad may be included in the packet so that its contents will not be misinterpreted by another keypad.

The message transmitted from the response unit 14, usually the keypad user entry, may be passed on by the base unit to an application running on a master computer, such as personal computer 24. Alternatively, the application running on the personal computer could determine data validity and/or answer correctness. The base unit may examine the data received from the keypads for data validity and, optionally, to determine if the user entry matches a correct or incorrect answer to a particular question.

If a keypad is not acknowledged within a certain period of time, the keypad may retransmit its packet again at 102a after a delay determined from a variable assigned to that keypad, such as its address, such as disclosed in commonly assigned United States Published Patent Application No. 2003/023689 A1, the disclosure of which is hereby incorporated herein by reference. This process continues until the keypad is acknowledged, times out, or polling is closed, at which time the keypad may either go into a deep sleep or totally power down. When a keypad receives its intended base transmission, it can light an LED indicating that the keypad transmission has been received. Alternatively, a correct or incorrect LED may be illuminated, or alternately, a message may be delivered to LCD display 22 depending on the mode.

The sequence resulting in a keypad transmission is initiated by the user making an entry on the keypad 18. The exact time when the keypad transmits depends on when a key is pressed and, in the case of a retransmission, a variable delay determined from the address of the keypad. While this could result in more than one keypad transmitting at a given time, due to similar delays having to be repeated at different addresses throughout the address range, the acknowledge process allows for retransmission using a different address-derived-delay to reduce the likelihood of this occurring more than once in a row. Assuming subsequent transmissions are needed for retries, the keypad delays its re-transmission by an amount calculated from a variable, such as its address. The purpose of the delay is to reduce the likelihood of a collision of transmissions from more than one keypad at the same time.

Figure 2A:
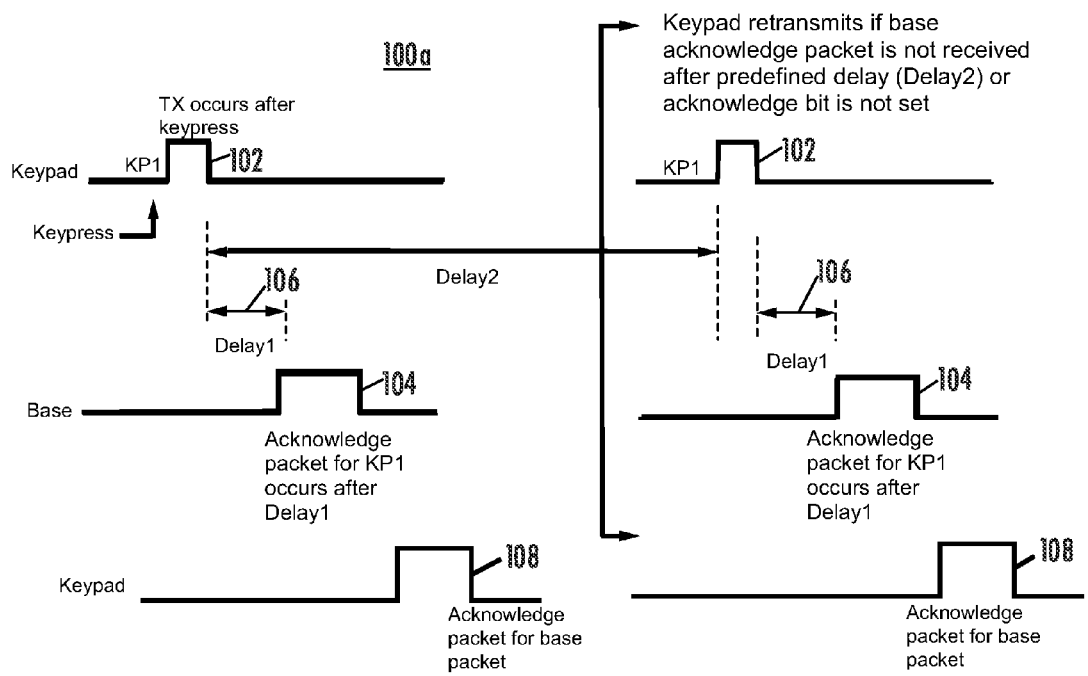
FIG. 2a is the same view as FIG. 2 of an alternative embodiment thereof.

An alternative protocol 100a may include a provision in the base acknowledge packet 104 for additional bits to allow keypads to be sent an additional message (FIG. 2a). This can be of either a global, subgroup, or individual keypad nature depending on the referenced addresses in the base packet. This allows for custom messages to be sent to keypads allowing the base to command the keypads into a special mode or for configuration. The protocol may further be modified to prove for the response unit 14 to send an acknowledge response unit packet 108 to the base unit. In such two-way acknowledgement scheme, the base sends a base message then listens for response unit acknowledgement messages from the keypads to determine if all relevant keypads received a base transmission. The base unit can retransmit a base packet to one or more keypads that did not acknowledge receipt of the original base transmission. This repeats until all keypads acknowledge or the system produces an error message that a "problem" keypad is unable to receive base transmissions because it is in a blind spot or otherwise malfunctioning.

In a two-way acknowledgement scheme 100a, the acknowledgement message transmitted 108 by the keypad may or may not include data entered by a user. The keypad may be instructed during a prior base acknowledgement to stay in an alert mode and not go into a deep sleep or power down. This allows the keypads to be in a state of preparation to receive a subsequent base transmission.

An alternative to a two-way acknowledgement scheme is to have the base unit send the base message multiple times, such as three times without expecting an acknowledge response unit packet 108 and without the response unit sending such acknowledge response unit packet 108. A tradeoff is made between a simpler scheme, but at a somewhat less level of reliability.

Optionally, the base unit 12 may be capable of sending independent packets to the keypads on an occasional basis for the purpose of passing messages to single or multiple keypads. This can be done on a regular, scheduled basis or as commanded by the application running on a personal computer 24. These packets may contain keypad address information to identify which keypads the messages are intended for. This provides an optional capability of remotely and automatically configuring the keypads and displaying messages in the case of keypads with LCD displays. This can be done either with or without requiring the keypads to respond to this base message with a message received acknowledgement packet. The base would carry out an acknowledge process for this message received acknowledgement in the same manner as if it were a normal key press it had received.

Figure 3:
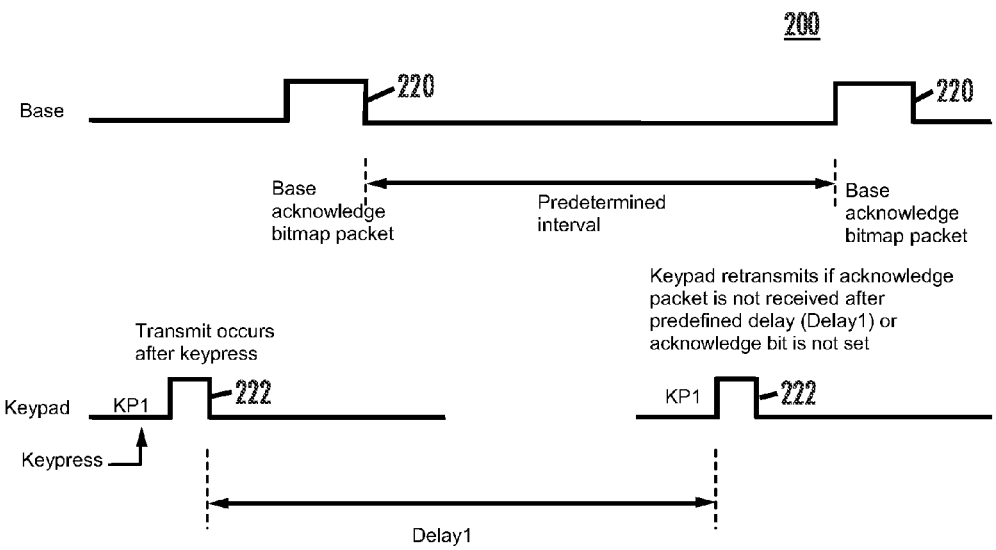
FIG. 3 is the same view as FIG. 2 of an alternative embodiment.

Referring now to FIG. 3, an event driven keypad transmit with a schedule driven acknowledge asynchronous protocol 200 is similar to protocol 100, but includes a schedule driven base acknowledgement, whereby the base transmits an acknowledge bit packet 220 that may consist of keypad acknowledgement or correct/incorrect bits at a regularly scheduled interval for all valid keypad transmissions receiving since the prior acknowledge bit package was sent, whether or not the base has received any keypad messages. The acknowledge contents of this packet may be for all keypads in use or for a sub-group of keypads. The base packet 220 may contain an address specification to allow the keypads to properly interpret the acknowledge bit package. Such address specification may be, for example, a list of keypad addresses that are being acknowledged. Alternatively, the address specification may be an address of a first keypad of a group of keypads to receive a message. Alternatively, the bit package may be a bitmap of the type disclosed in commonly assigned U.S. Pat. No. 5,724,357.

The sequence resulting in a keypad transmission 222 is initiated by the user making an entry on the keypad 18. The exact time when the keypad transmits depends at least on when a key is pressed. It may further be dependent on a variable delay determined from a variable assigned to that keypad, such as the address of the keypad, particularly in the case of a retransmission from a keypad that was not acknowledged. This is in order to reduce the likelihood of a repeat collision.

Figure 4:
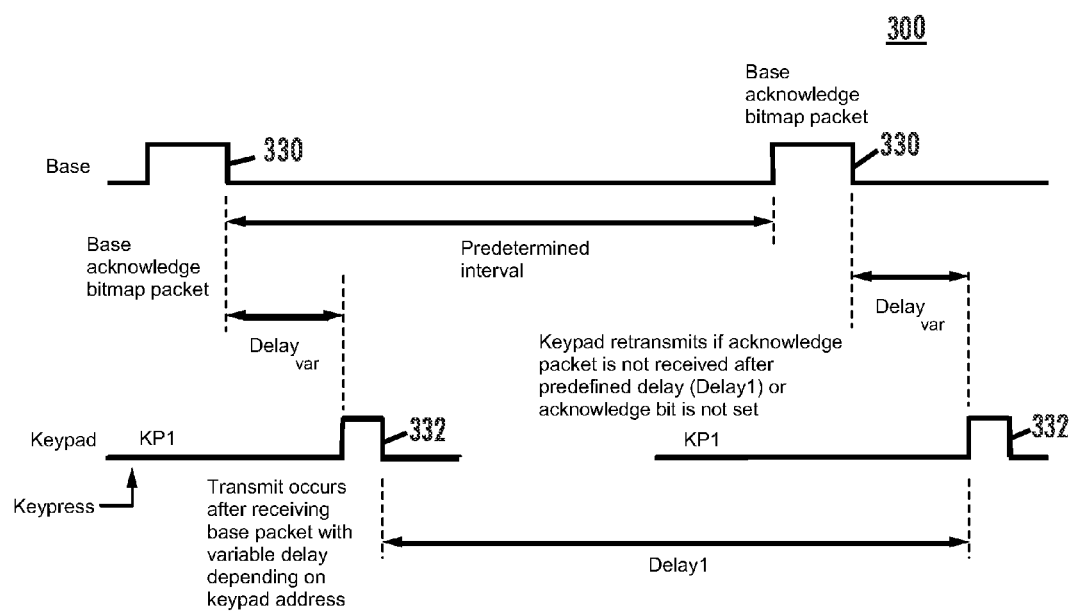
FIG. 4 is the same view as FIG. 2 of another alternative embodiment.

Referring now to FIG. 4, a quasi-event driven keypad transmit with collision avoidance asynchronous protocol 300 is similar to protocol 200, but includes the response units 14 being configured to wait until one base packet 330 has been received by the response unit before transmitting a keypad packet 332 to prevent a collision with a base packet. Waiting for a base transmission has the advantage of allowing the base to send messages to the keypads without having to first receive a keypad transmission, while reducing the likelihood of collision between keypad transmissions and base transmissions. Allowing the keypad to receive a message from the base without the base first receiving a keypad transmission can provide additional functionality. Following receipt of the base packet 330, the keypad can transmit its response 332 delayed by an interval calculated from a variable assigned to that keypad, such as the address of the keypad. While this could result in more than one keypad transmitting at a given time, due to similar delays having to be repeated at different addresses throughout the address range, the acknowledge process allows for retransmission from interfering keypads using a different address derived delay to reduce the likelihood of this interference occurring more than once in a row. If a keypad has not been acknowledged, it waits again for a base transmission and the next time uses a different delay amount so that it will not transmit at the same time after the base transmission as before. While keypad transmissions 332 may be timed at least in part on receipt of a base transmission, more keypads are possible for a given base transmission interval than with a traditional time division multiplex scheme. This is because more than one keypad may be allowed to transmit after a particular delay from receipt of a base transmission. However, not-all keypads are likely to have a user input to transmit after a particular base transmission and any resulting collision between keypad transmissions can be resolved by retransmissions after a delay period that will vary for subsequent keypad transmissions.

Protocol 300 may include a provision in the base-to-keypad acknowledge packet 330 for additional bits to allow keypads to be sent an additional message. This can be of either a global, subgroup, or individual keypad nature depending on the referenced addresses in the base packet. This allows for custom messages to be sent from the base unit 12 to keypads allowing the base to command the response units 14 into a special mode or for configuration. This can be done either with or without requiring the response unit to respond to this base message 330 with an acknowledge message, such as message 108 shown in FIG. 2a. If the keypads are required to acknowledge the base message, they would do this through the same process as if they had made a key entry, but the message from the keypad would be a message-received acknowledge, not user input data, and the base would carry out the acknowledge process in the same manner as if it were a normal key press it had received.

Additionally, the base unit 12 may be capable of sending independent packets 330 to the response units 14 on an occasional basis for the purpose of passing messages to single or multiple keypads. This can be done on a regular, scheduled basis or as commanded by the application running on a personal computer. These packets may contain keypad address information to identify which keypads the messages are intended for. This provides a capability of remotely and automatically configuring the keypads or displaying messages in the case of keypads with LCD displays.

For any of the event and schedule driven acknowledgement protocols 100, 100a, 200, 300, instead of the base determining if and when the base sends its packets, an application running on personal computer 24 controlling the system may determine the actions of the base. This allows either event or schedule driven acknowledgement and keypad interaction to occur but follows the same principles of keypad to base communication. It has an advantage of flexibility in allowing the application to determine the functionality of the system without fixing it in the base hardware and/or firmware.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or priviledge is claimed are defined as follows:

1. A wireless response system, comprising:
    a base unit having a base transceiver, said base transceiver adapted to wireless signal transmitting and wireless signal receiving;
    a plurality of response units, each having a response unit transceiver, a user input device and a response unit control, said response unit transceiver adapted to wireless signal transmitting and wireless signal receiving;
    said user input device receiving user input selections;
    said response unit control adapted to control said response unit transceiver to transmit a response unit transmission in response to said user input device receiving a user input selection;
    said base transceiver adapted to receive valid response unit transmissions and to transmit a base transmission including a base acknowledgement of any valid response unit transmissions received by said base unit;
    wherein said response unit transceiver transmits a response unit transmission generally asynchronously in an interval following receipt of a base transmission after a delay that is based at least in part on a variable assigned to that response unit, wherein conflict between response unit transmissions from different ones of said response units is not precluded; and
    wherein said response unit determines if a base acknowledgement has been received after a response unit transmission and retransmits said response unit transmission after receipt of another base transmission if a base acknowledgement of a previous response unit transmission of that response unit is not received, wherein said response unit retransmits said response unit transmission in another interval following said another base transmission after another delay that is different from said delay in order to reduce the likelihood of a repeat conflict with another one of said response units.

2. The response system as claimed in claim 1 wherein said base unit transceivers transmit a base acknowledgement without substantial delay, wherein the response unit that transmitted the valid response will recognize that base acknowledgement.

3. The response system as claimed in claim 1 wherein a base acknowledgement includes an address for the response unit that transmitted the valid response unit transmission.

4. The response system as claimed in claim 1 wherein said base acknowledgement acknowledges receipt of valid response unit transmissions from more than one response unit.

5. The response system as claimed in claim 1 wherein said base acknowledgement includes response correctness information.

6. The response system as claimed in claim 1 wherein said base unit transceiver is adapted to transmitting a data packet to at least one response unit independent of receipt of a valid response unit transmission from at least one response unit.

7. The response system as claimed in claim 6 wherein each said response unit includes a visual display and wherein said visual display displays at least a portion of a data packet from said base unit.

8. The response system as claimed in claim 6 wherein a data packet includes at least one base acknowledgement in response to receipt of a valid response unit transmission since a previous transmission of a data packet.

9. The response system as claimed in claim 6 wherein said data packet includes at least one correctness message in response to receipt of a response unit transmission since a previous transmission of a data packet.

10. The response system as claimed in claim 6 wherein said data packet includes configuration data, the configuration data adapted to changing configuration of at least one of said response units.

11. The response system as claimed in claim 6 wherein said data packet includes an address specification, said address specification establishing the manner in which said response units should respond to that data packet.

12. The response system as claimed in claim 6 wherein said response units are adapted to avoiding transmission during a data packet transmission from said base unit to said response units.

13. The response system as claimed in claim 12 wherein said response units are adapted to avoiding transmission until receipt of a data packet transmission to avoid transmission during a data packet transmission.

14. The response system as claimed in claim 12 wherein said response system transceiver transmits a response unit transmission after a delay since receipt of a data packet transmission.

15. The response system as claimed in claim 14 wherein said response unit control includes an algorithm for resolving collisions between response unit transmissions.

16. The response system as claimed in claim 6 wherein said response unit transceiver transmits a response unit acknowledgement in response to receipt of a valid data packet by that response unit.

17. The response system as claimed in claim 16 wherein said base unit transmits a base acknowledgement transmission in response to receipt of a response unit acknowledgement that was transmitted by a response unit.

18. A method of receiving user responses from a plurality of users at a base unit, comprising:
- providing a base unit having a base transceiver that is adapted to wireless signal transmitting and wireless signal receiving;
- providing a plurality of response units, each of the response units including a response unit transceiver and a user input device, the response unit transceiver is adapted to wireless signal transmitting and wireless signal receiving;
- receiving user input selections with said user input device;
- transmitting a response unit transmission with said response unit transceiver in response to said user input device receiving a user input selection; and
- receiving valid response unit transmissions with said base transceiver and transmitting a base transmission with said base unit transceiver including a base acknowledgement of any valid response unit transmissions received by said base unit;
- wherein said transmitting a response unit transmission includes asynchronously transmitting the response unit transmission in an interval following receipt of a base transmission after a delay that is based at least in part on a variable assigned to that response unit, wherein conflict between response unit transmissions from different ones of said response units is not precluded;
- determining if a base acknowledgement has been received after said transmitting a response unit transmission and retransmitting a response unit transmission after receipt of another base transmission if a base acknowledgement of a previous response unit transmission of that response unit is not received, wherein said response unit retransmits said response unit transmission after another delay that is different from said delay in order to reduce likelihood of a repeat conflict with another one of said response units.

\* \* \* \* \*